US006992479B2

(12) United States Patent
Lequesne et al.

(10) Patent No.: US 6,992,479 B2
(45) Date of Patent: Jan. 31, 2006

(54) MAGNETIC SENSOR ARRAY CONFIGURATION FOR MEASURING A POSITION AND METHOD OF OPERATING SAME

(75) Inventors: Bruno P. B. Lequesne, Troy, MI (US); Avoki M. Omekanda, Rochester, MI (US); Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 186 days.

(21) Appl. No.: 10/356,457

(22) Filed: Jan. 31, 2003

(65) Prior Publication Data

US 2004/0150393 A1 Aug. 5, 2004

(51) Int. Cl.
*G01B 7/14* (2006.01)
(52) U.S. Cl. .......................... 324/207.21; 324/207.24; 324/207.2
(58) Field of Classification Search ............. 324/207.2, 324/207.21, 207.22, 207.24, 207.25, 207.26; 338/32 R, 32 H
See application file for complete search history.

(56) References Cited

U.S. PATENT DOCUMENTS

| | | | | |
|---|---|---|---|---|
| 3,332,009 A | * | 7/1967 | Seale | 324/207.14 |
| 4,612,502 A | * | 9/1986 | Spies | 324/207.22 |
| 5,056,049 A | * | 10/1991 | O'Neill | 702/55 |
| 5,351,028 A | * | 9/1994 | Krahn | 338/32 R |
| 5,530,345 A | * | 6/1996 | Murari et al. | 324/207.2 |
| 5,589,769 A | * | 12/1996 | Krahn | 324/207.26 |
| 6,201,466 B1 | * | 3/2001 | Schroeder | 338/32 R |
| 6,246,234 B1 | * | 6/2001 | Yokotani et al. | 324/207.21 |
| 6,690,159 B2 | * | 2/2004 | Burreson et al. | 324/207.23 |
| 6,776,058 B1 | * | 8/2004 | Schroeder | 73/862.333 |

* cited by examiner

*Primary Examiner*—Jay Patidar
(74) *Attorney, Agent, or Firm*—Jimmy L. Funke

(57) ABSTRACT

A magnetic position sensor for measuring a position of a ferromagnetic target over a range. The sensor comprises a magnet at least as long as the range and a sensor array mounted upon a surface of the magnet. The array is at least as long as the range and includes a plurality of sensing elements mounted a fixed distance from the surface of the magnet. The magnet length and the fixed distance have values such that a set of relatively constant values, preferably values of magnetic flux density, is measurable in the sensor array in the absence of the ferromagnetic target. A method of making a position sensor is also disclosed, as is a method of measuring the position of a ferromagnetic target over a range.

40 Claims, 12 Drawing Sheets

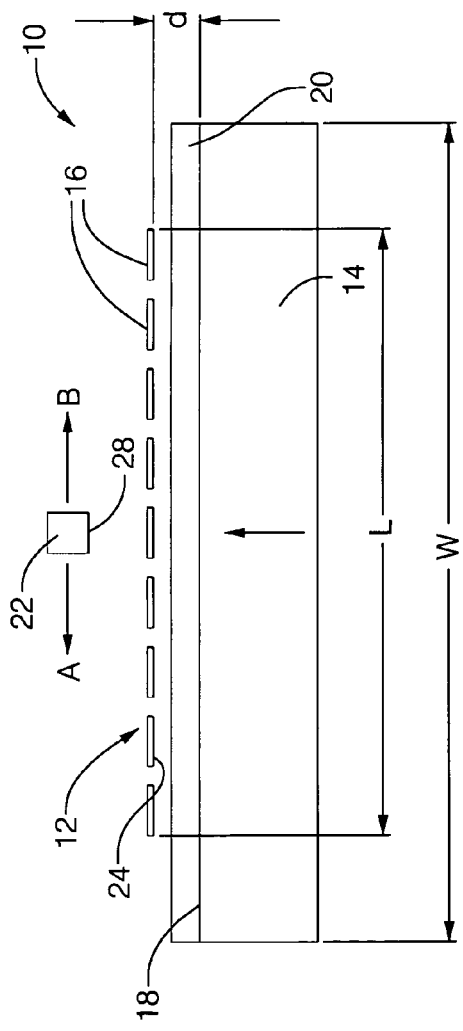

FIG. 2

| DEGREE OF ACCURACY | OPTIMUM DIMENSION FOR A GIVEN DEGREE OF ACCURACY | | |
|---|---|---|---|
| .01% | L≅R | W=4.2R | d=0.50R | R IS THE DESIRED RANGE<br>L IS LENGTH OF ARRAY<br>d IS DISTANCE FROM MAGNET TO TARGET<br>W IS OVERALL LENGTH OF MAGNET |
| 0.5% | L≅R | W=2.8R | d=0.33R | R IS THE DESIRED RANGE<br>L IS LENGTH OF ARRAY<br>d IS DISTANCE FROM MAGNET TO TARGET<br>W IS OVERALL LENGTH OF MAGNET |
| 1.0% | L≅R | W=2.3R | d=0.27R | R IS THE DESIRED RANGE<br>L IS LENGTH OF ARRAY<br>d IS DISTANCE FROM MAGNET TO TARGET<br>W IS OVERALL LENGTH OF MAGNET |

MAGNETIC SENSOR ARRAY CONFIGURATION FOR MEASURING A POSITION AND METHOD OF OPERATING SAME

TECHNICAL FIELD

The invention relates to position sensors and, more particularly, to a configuration for a magnetic sensor array for measuring position of a target and a method of operating a magnetic sensor array to sense the position.

BACKGROUND OF THE INVENTION

There are a variety of approaches to sense position with magnetic sensors that can be used in, for example, a torque-sensing apparatus for automotive power steering. Several sensor configurations have been devised that use a single sensing element facing either a moving magnet, or a moving tooth or slot. In the latter case, the sensing element is mounted on a stationary magnet. These sensors use a single, small sensing element, so they are low cost. However, they may not provide the linearity, precision and repeatability necessary in more demanding applications, such as for torque sensing.

A different type of sensor configuration uses a long sensing element positioned on the surface of a magnet. The element faces a moving ferromagnetic strip or target. Long sensing elements, however, are expensive and fragile. Recently, a magnetoresistor sensor array has been proposed as an alternative to other sensing elements. An optimized configuration of such sensor arrays for use in detecting two-dimensional movement of a magnetic target has heretofore not been examined.

SUMMARY OF THE INVENTION

The invention discloses a magnetic sensor configuration for sensor arrays. A first embodiment of the invention includes a magnetic position sensor for measuring a position of a ferromagnetic target over a range. The sensor includes a magnet having a magnet length at least as long as the range and a sensor array mounted upon a surface of the magnet. The array has an array length at least as long as the range, and the array includes a plurality of sensing elements mounted a fixed distance from the surface of the magnet. The magnet length and the fixed distance have values such that a set of relatively constant values is measurable in the sensor array in the absence of the ferromagnetic target.

A second embodiment of the invention is a method of making a magnetic position sensor for measuring a position of a ferromagnetic target over a range. The method includes the steps of selecting a magnet having a magnet length at least as long as the range and mounting a sensor array upon a surface of the magnet. Again, the array has an array length at least as long as the range, and the array includes a plurality of sensing elements a fixed distance from the surface of the magnet. The magnet length and the fixed distance have values such that a set of relatively constant values is measurable in the sensor array in the absence of the ferromagnetic target.

A third embodiment of the invention is a method of measuring the position of a ferromagnetic target over a range. The method includes the steps of forming a stationary magnetic position sensor, spacing the target apart from the plurality of sensing elements opposite the surface of the magnet, the target freely movable along the array over the range and measuring a plurality of values of a component of magnetic flux density across the magnet in the presence of the target. The step of forming a stationary magnetic position sensor includes the steps of selecting a magnet having a magnet length at least as long as the range and mounting a sensor array upon a surface of the magnet. The array has an array length at least as long as the range, and the array includes a plurality of sensing elements located a fixed distance from the surface of the magnet. One variation to this embodiment includes the step of selecting the magnet length and the fixed distance such that a set of relatively constant values of magnetic flux density is measurable across the magnet in the absence of the ferromagnetic target. Another variation to this embodiment includes the steps of measuring a second plurality of values of the component of magnetic flux density across the magnet in the absence of the target and subtracting each of the second plurality of values of the component of magnetic flux density measured at a unique position along the magnet from one of the plurality of values of the component of magnetic flux density measured at the same unique position along the magnet.

Many other variations in the summarized embodiments are contemplated and described herein. Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a plan view according to FIG. 1;

DESCRIPTION OF THE PREFERRED EMBODIMENT

Figure 1:
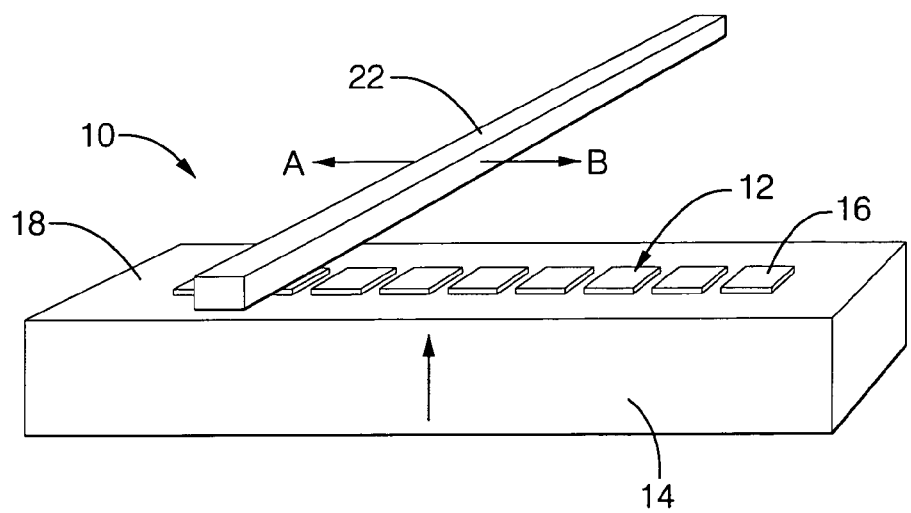
FIG. 1 is a perspective view of a sensor configuration according to the present invention for measuring the distance traveled by a target.

Referring first to FIGS. 1 and 2, the sensor 10 comprises a sensor array 12 of length L mounted on a magnet 14 of length W. Although the magnet 14 is shown as a permanent magnet, the magnet 14 can be an electromagnet. The active elements, or sensing elements, 16 of the sensor array 12 are located at a distance d from the magnet surface 18. A non-ferromagnetic spacer 20 may be included between the sensor array 12 and the magnet 14, as discussed in more detail herein, and its height forms a part of the distance d, as described in more detail herein. Details of the layout and materials of a suitable magnetoresistor array 12 are shown in U.S. Pat. No. 6,201,466, the disclosure of which is incorporated herein in its entirety by reference. Sensor arrays incorporating other types of magnetic sensor elements, such as Hall sensors, etc., are also contemplated within the scope of the present invention.

The sensor array 12 and magnet 14 form a stationary assembly facing a small, long ferromagnetic bar or steel target 22. The bar, or target, 22 may be fabricated by a number of techniques, for instance by an etching or a deposition process using a non-magnetic substrate according to techniques known in the art. The target 22 may be as small as 0.1 mm by 0.1 mm in cross-section. The target 22 is operatively connected to, for example, a rack and pinion steering gear assembly in a manner known in the art such that the target 22 moves in the directions indicated by the arrows A and B upon rotation of, for example, a torsion-bar that is a part of the steering gear assembly. The target 22 is generally not in contact with the stationary assembly, that is the bottom 28 of the target 22 does not rest upon the sensor array 12, although it is desirable that it be close to the sensor array 12 as discussed in more detail herein. The target 22 can also be embedded in a movable non-ferromagnetic slider (not shown), which can provide additional stability for the target 22.

Figure 3:
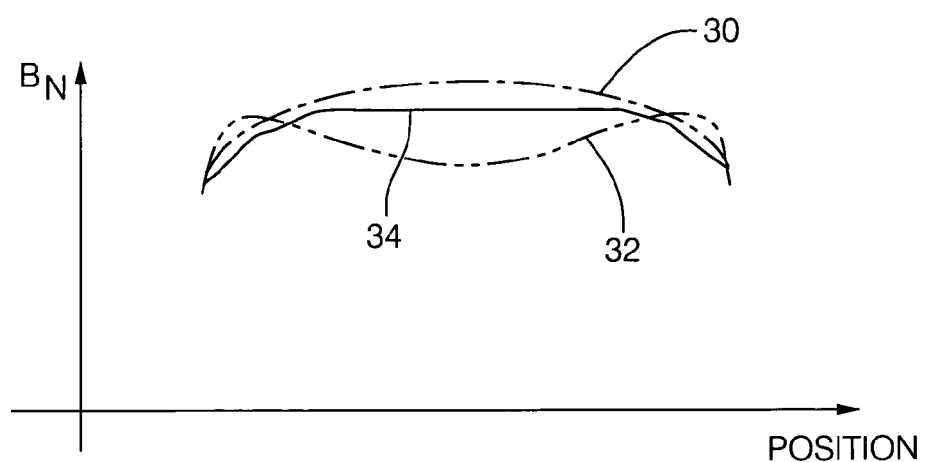
FIG. 3 is a graph of the magnetic flux density across a magnet in the absence of a target.

The pattern of the magnetic flux density across a magnet, such as magnet 14, in the absence of a target 22 may be a convex curve 30 or a concave curve 32 as shown in FIG. 3. In the graph of FIG. 3 and the remainder of the graphs wherein flux density is included, the flux density shown and described is the component of flux density normal, or perpendicular, to the length of the magnet 14, $B_N$. This is because such sensing elements 16 sense one component of flux density, and the useful component of flux density in this case is the component normal to the magnet surface 18. In any event, referring back to FIG. 3, a transition curve 34 between the two patterns has a flat characteristic. Which of these "background" curves 30, 32, 34 occurs, as explained below, depends upon the length of the magnet 14 as indicated by W in FIGS. 1 and 2 and the distance d between the magnet surface 18 and the sensing elements 16 of the sensor array 12. Of course, convex, concave and flat "curves" merely represent the relative values of magnetic flux density across the magnet. For example, the convex curve 30 represents values for magnetic flux density whereby the magnetic flux density values measured from the center of the magnet towards the ends of the magnet continuously decrease from the value at the center. Conversely, the concave curve 32 represents values for magnetic flux density whereby the magnetic flux density values measured from the center of the magnet towards the ends of the magnet continuously increase from the value at the center until the end of the magnet is reached. Finally, a flat curve 34 means that magnetic flux density values measured across the magnet remain relatively constant over a length of the magnet around the center.

In the presence of a target 22, a local peak of magnetic flux density is observed, whether the background curve is convex 30, concave 32 or flat 34. The local peak is superimposed onto the background curve, pulling the background curve either "up" or "down." The background curve is again observable if the target 22 is removed. Testing has determined that this local peak does not change shape or size as it moves left or right with the target 22, and that the pattern containing the local peak is superimposed over the background curve at each location along the curve.

Figure 13:
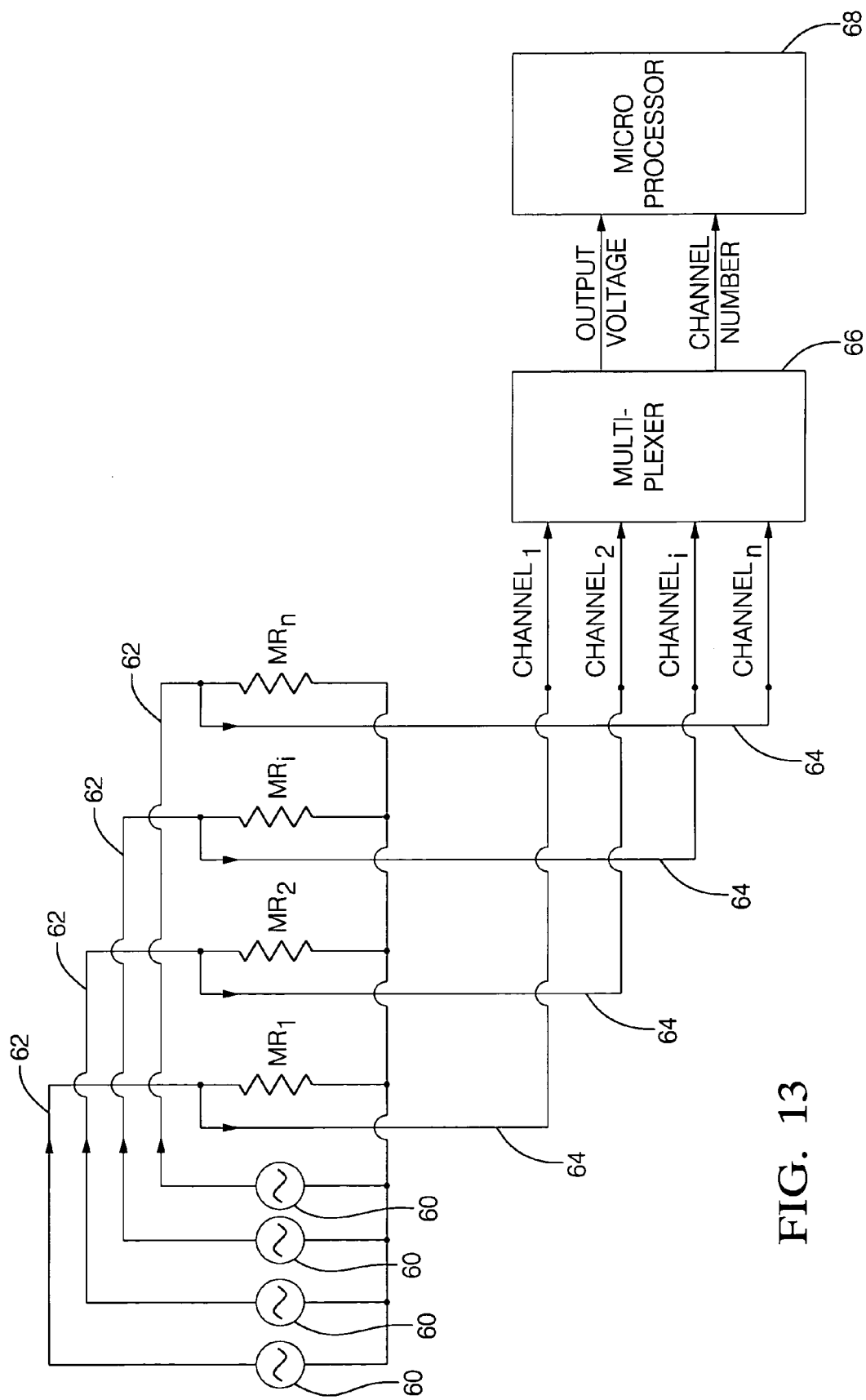
FIG. 13 is a circuit diagram including a circuit for exciting a magnetoresistor sensor array and a circuit for measuring the resultant magnetic flux density in the magnet.

A magnetic flux density can be generated and measured in the magnet 14, whether the target 22 is present or not, by exciting the sensing elements 16, then measuring the magnetic flux density either directly or indirectly by measuring a related parameter. One example of a circuit that can be used to measure magnetic flux density is shown in FIG. 13 where the sensing elements 16 are magnetoresistors. There are "n" sensing elements 16, each represented by an impedance and labeled $MR_1, MR_2, \ldots MR_i, \ldots MR_n$. Excitation of the sensing elements 16 can be performed by any number of means. In this embodiment, excitation is performed by one or more constant current sources 60. Each sensing element 16 is connected to a constant current source 60 by a lead 62. The other ends of the sensing elements 16 are commonly grounded.

The remainder of the circuit provides means for measuring the magnetic flux density. As the constant current from a constant current source 60 flows across each of the sensing elements 16, $MR_1, MR_2, \ldots MR_i, \ldots MR_n$, a second lead 64 from each of the sensing elements 16 detects a voltage drop and provides each voltage drop to respective channels, Channel 1, Channel 2, . . . Channel i, . . . Channel n, of a multiplexer 66. The multiplexer 66 provides an output voltage associated with each channel number to a microprocessor 68 for additional processing and/or display. The microprocessor 68 can be, for example, part of a standard chassis or engine controller. In any case, memory may be required for storing the output data. This circuit, thus, measures voltage as an indicator of the magnetic flux density at locations along length W of the magnet 14. Of course, many other circuits known to those of skill in the art can be used to generate and measure magnetic flux density. For example, if Hall elements are used as the sensing elements 16, a constant voltage source can be applied across each of the sensing elements 16, while a similar circuit to that in FIG. 13 measures the magnetic flux density.

Reading the local peak of magnetic flux density in the presence of a target 22 is desirable, as this will indicate the location of the target 22 along the measurement range of the sensor 10. Therefore, filtering out the background curve needs to be performed. This can be achieved in either one of two ways. First, the background pattern in the absence of a target 22 can be read according to known devices and methods and stored in electronic memory, such as that in a standard engine controller. Once the background pattern is stored, position detection along the sensor can be performed by subtracting the stored background pattern from the signal obtained in the presence of a target whose position is desired. This method, illustrated hereinafter with an example with respect to FIGS. 11 and 12, has the advantage of being compatible with a sensor 10 of any dimensions. However, it requires a pre-calibration process that can add cost, complexity, and a source of error to the sensor 10.

The second method eliminates this need for pre-calibration as it results in a flat background pattern, such as the flat curve 34 shown in FIG. 3. In this second method, dimensions, or combinations of dimensions, for the sensor 10 provide a flat-patterned background. The local peak due to the presence of a target 22 is easily discernable merely by observation, i.e., measuring each point along the curve and determining where the peak is. No subtraction of the background pattern is necessary to accurately determine the location of the target 22 along the sensor array 12.

It is important to note that when referring to a "flat" pattern of flux density, flatness is a relative notion. First, the magnetic flux density will always droop across the edges of the magnet 14. Flatness is really needed only over the length of the sensor array 12. Further, flatness in this context means that there exists a set of relatively constant values around the center of the array 12. By relatively constant, it means that each of the set of values is within a certain percentage of a maximum value, here, the value of the flux density in the center of the array 12. For example, a particular configuration, or set of dimensions, for the sensor 10 can provide a flatness within 0.5% of the value at the center over the length L of the sensor array 12. Each of the values of the set is within 0.5% of the value at the center of the array 12. With these principles in mind, the development of a desirable configuration for a sensor array 12 to be used in a magnetic position sensor 10 occurs. Although the description shows a straight target traveling in a linear path along the sensor 10, the invention can be used with targets of varying shapes traveling along the measurement range of the sensor 10.

Figure 4:
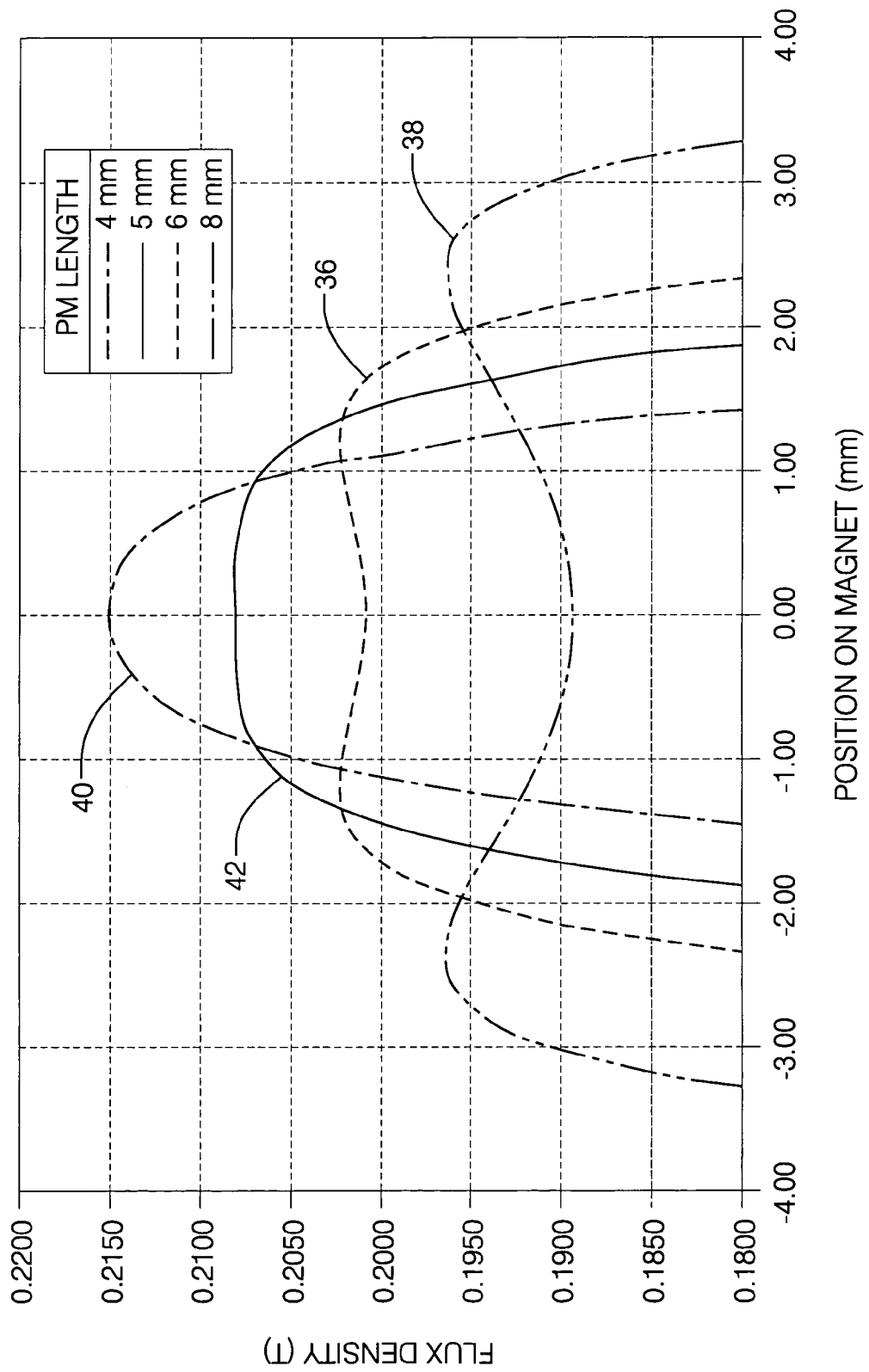
FIG. 4 is a graph of the magnetic flux density across magnets of varying lengths in the presence of a target.

The length of the magnet 14, which is indicated by dimension W in FIGS. 1 and 2, is first determined for a specific case where the distance d between the surface 18 of the magnet 14 and the bottom surface of the sensing elements 16 of the sensor array 12 is equal to an arbitrary value of 0.60 mm. The magnetic flux density across a bare magnet 14, i.e., one with no target 22 present, at the distance d of 0.60 mm was calculated with a three-dimensional finite element software package. The results are shown in FIG. 4 for magnets having lengths of four mm, five mm, six mm and eight mm. FIG. 4 shows that longer magnets of six and eight mm yield concave patterns, respectively shown as curves 36 and 38. As the magnet length W shortens, the pattern becomes more convex. A magnet 14 of four mm results in the convex curve 40. When the magnet length W is approximately five mm, a flat pattern 42 is observed. For a given distance d there is, therefore, a preferable magnet length W, five mm in this example, that provides a flat pattern 42 around the center of the magnet 14. In this example, and in all of the other examples herein, the magnet 14 has a thickness (height) of two mm, while the width of the magnet 14 is five mm. Generally, the height and width of the magnet 14 will depend upon the application and the space available for the sensor 10.

Figure 5:
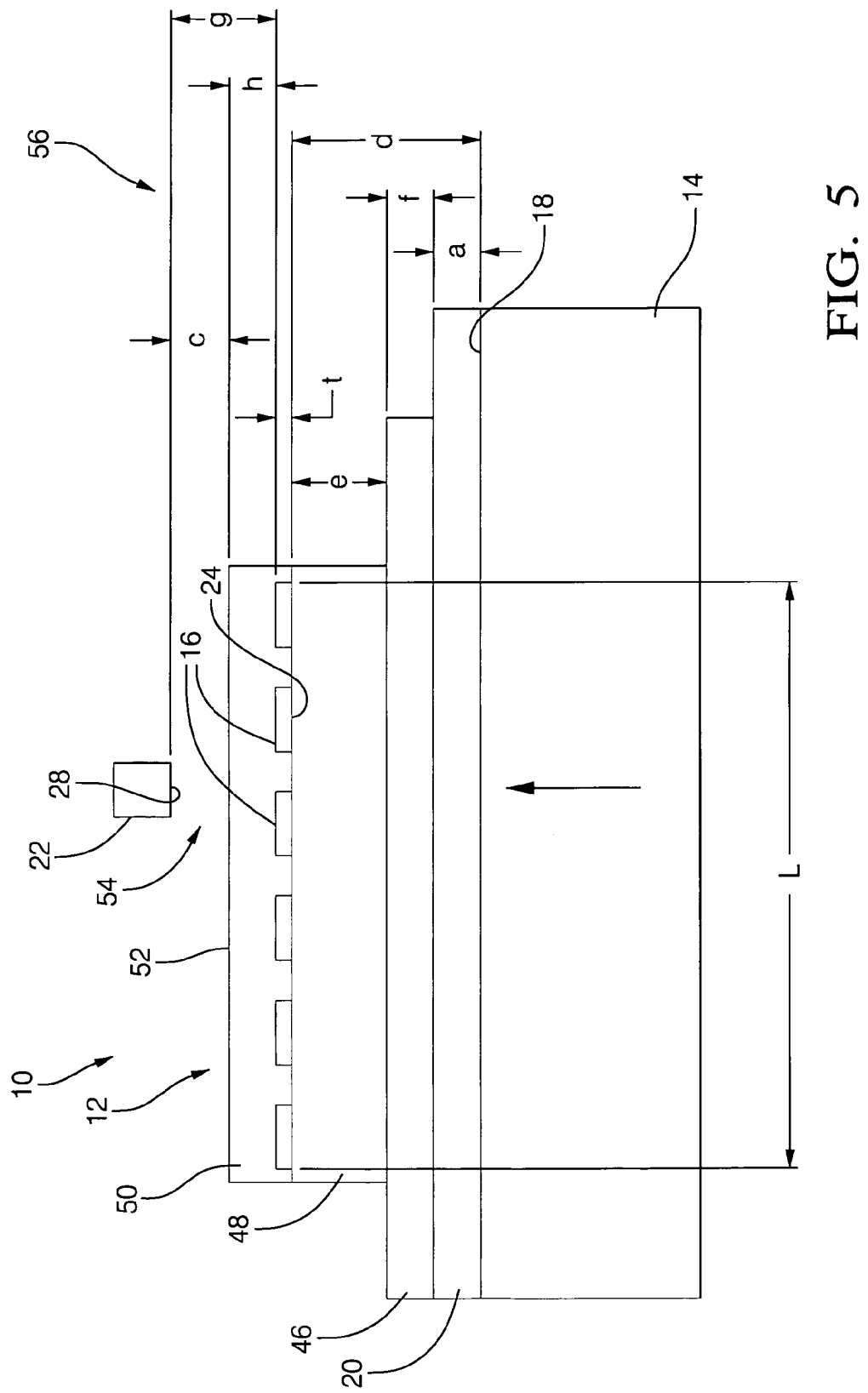
FIG. 5 is a cross-sectional view of the fabrication layers of the sensor configuration according to FIG. 1.

The distance d between the top 18 of the magnet 14 and the bottom of the sensing elements 16 needs to be defined more precisely, especially with respect to the practical design of a sensor array 12. FIG. 5 shows the fabrication layers of the sensor array 12 mounted upon the magnet 14. The target 22 is also shown. The sensor array 12 is fabricated upon a leadframe 46 of thickness f. The leadframe 46 is non-ferromagnetic, copper by example. The thickness f is typically on the order of 0.25 mm. The array 12 includes a substrate 48, usually of a semiconductor material, of thickness e. The thickness e is usually on the order of 0.60 mm, but the thickness e could be much smaller if the chip is placed upside-down, known as "flip-chip" construction.

The active area of the sensor array 12, i.e., the area where the sensing elements 16 are mounted, is of thickness t. The thickness t of the active area is usually on the order of microns, much smaller than any of the other dimensions. For all practical purposes, the thickness t equals zero. The distance d between the top 18 of the magnet 14 and the top of the substrate 48 upon which the sensing elements 16 are mounted, i.e., the bottom of the sensing elements 16, is equal to at least the total of the thickness e of the substrate 48 and the thickness f of the leadframe 46. However, the distance d could be larger, either by special design of the leadframe 46 and substrate 48, or by adding a spacer, such as spacer 20, between the magnet 14 and the leadframe 46. The spacer 20 of FIG. 2 is shown in FIG. 5 with a thickness a. Thus, the distance d is equal to the sum of the thickness values a, e and f. From a magnetic point of view, the distinction between these thickness values is not necessary. Only the total distance, or thickness, d between the top 18 of the magnet 14 and bottom of the sensing elements 16 is used. Because the thickness difference between the bottom of the sensing elements 16 and the top of the sensing elements 16 is largely insignificant, the remaining references to the thickness d will refer to it as the distance between the magnet top surface 18 and the sensing elements 16.

Although not critical to the discussion herein, an overmolding material in a layer 50 of thickness h can be added to protect the sensor array 12. The overmold layer 50 may be as thin as 0.2 or 0.3 mm. The top of this layer 50 constitutes the outside surface 52 of the sensor 10. A gap 54 of thickness c exists between the outside surface 52 of the sensor 10 and the bottom surface 28 of the target 22. This gap 54 may include air and/or a protective coating for the target 22 and target assembly (not shown). From a magnetic point of view, the overmold layer 50 and the gap 54 are equivalent. They are combined in a so-called "airgap" 56 of thickness g, which is equal to the sum of the thickness h of the overmold layer 50 and the thickness c of the gap 54.

Figure 6:
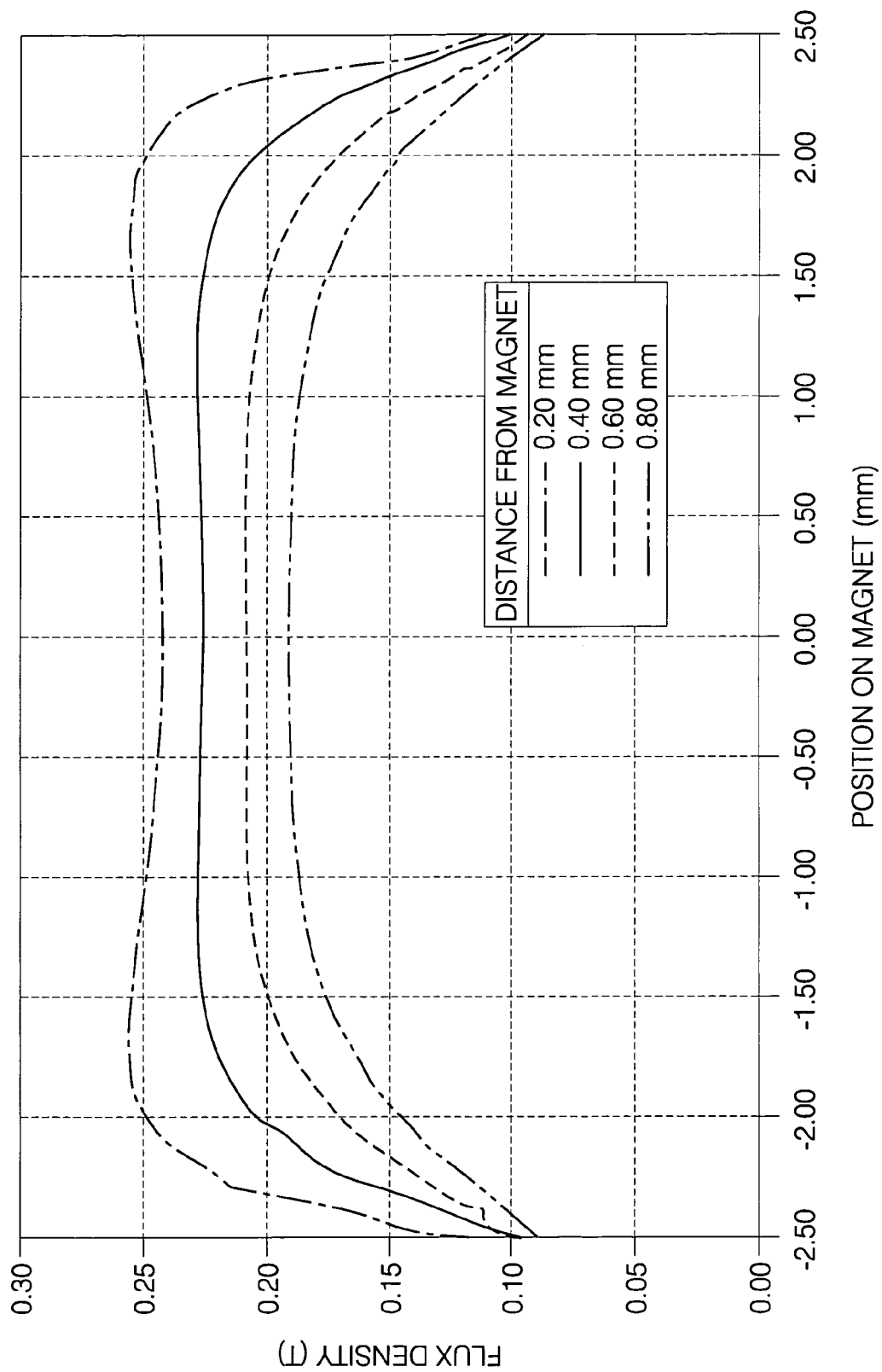
FIG. 6 is a graph of the magnetic flux density across a magnet of a fixed length in the presence of targets at varying distances from the magnet.

FIG. 6 shows the magnetic flux density across a bare magnet 14, i.e., where no target 22 is present. The magnet length W is five mm. The distance d measured from the magnet surface 18 to the sensing elements 16 varies; each curve has a distanced of 0.20 mm., 0.40 mm, 0.60 mm and 0.80 mm, respectively. As seen from FIG. 6, the closer the sensor array 12 is to the magnet 14, the more concave the characteristic. The curve associated with a distance d of 0.80 mm is a convex characteristic. The most concave curve is associated with a distance d of 0.20 mm. Thus, for a given magnet length W of five mm, there is a preferable distance d, 0.60 mm in this case, that provides a flat pattern around the center of the magnet 14.

This derived combination of a specific magnet length W and distance d provides a "flat" area characterized by a set of relatively constant values in the characteristic around the center of the magnet 14. If the desired range of the sensor 10 is a range R, then the array length L should be at least as long as the range R in order to obtain measurements over the entire range R. Thus, the flat area around the center of the magnet 14 should be at least as long as the array length L so that accuracy exists over the entire array length L.

Figure 7:
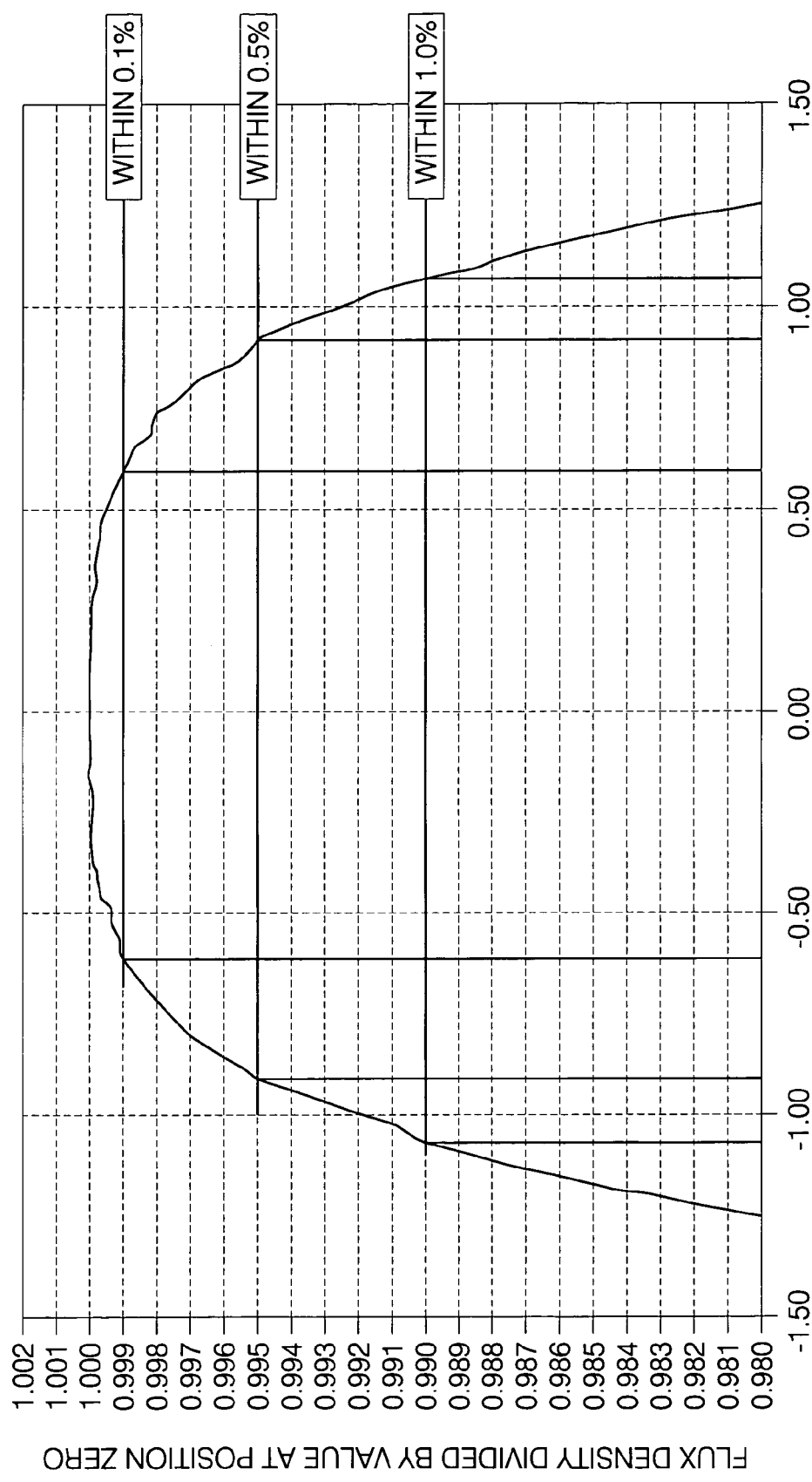
FIG. 7 is a graph of the magnetic flux density across a 5 mm magnet normalized to the flux density at the center of the magnet in the absence of a target.

Flatness, as mentioned, is relative. The magnetic flux density pattern normalized to the value in the center of the magnet 14 for the dimensions derived in this example in which the magnet length W equals five mm and the distance d equals 0.60 mm is shown in FIG. 7. FIG. 7 is also shown with a much enlarged scale over that shown in FIGS. 4 and 6. As can be seen, the characteristic is not flat; it is actually slightly convex. In the center of the magnet 14, the relative flux density is defined as 1.00. The farther from the center, the smaller the value of the flux density. The flux density is within 0.1% of the peak value, i.e., the value at the center of the magnet 14, within ∀0.61 mm of the center of the magnet 14. It is also seen that the flux density is within 0.5% of the peak value within ∀0.91 mm of the center of the magnet 14 and within 1.0% of the peak value within ∀ 1.10 mm of the center of the magnet 14. Referring to FIG. 7, and assuming that a 0.5% value for flatness is satisfactory, an array 12 having a length L of 1.8 mm can be used with a magnet 14 having a length W of five mm to measure a displacement range R of 1.8 mm, provided the sensing elements 16 are located 0.60 mm from the magnet surface 18. For a 0.1% flatness target, the array 12 should have at least an array length L of 1.2 mm where the magnet length W is five mm and the distance d is 0.60 mm. Similarly, for a 1.0% flatness target with the same magnet length W and distance d, the array 12 should have a length L of 2.2 mm, etc.

This description assumes that a desirable array length L is calculated for given values of the magnet length W and the distance d. For given values of magnet length W and distance d, the available measurement range R changes with the length L of the array 12. By example to FIG. 7, the array 12 having a length L of 2.2 mm can measure a displacement relatively accurately for a measurement range R of up to 2.2 mm. To obtain better accuracy for a sensor 10 having the same magnet length W and distance d, the array length L decreases to no more than 1.2 mm. Consequently, the available measurement range R decreases to no more than 1.2 mm. In the actual design of a sensor 10, however, specifications typically call for a specific range R from which the magnet length W and distance d should be deduced.

The length L of the array 12 should be at least as long as the desired range R of the sensor 10. The other dimensions can be deduced using scaling laws. Specifically, the same flux density pattern is to be expected from proportional sets of sensor dimensions along the length L of the sensor array 12. Thus, if a matrix X, wherein $X=(x_1, x_2, \ldots x_n)$, groups together all physical dimensions of the sensor (W, L, d, g, etc.), the same flux density pattern will be obtained from a sensor with physical dimensions grouped similarly in a matrix Y, where:

$Y=(y_1, y_2, \ldots y_n)$; and $y_i = \lambda \, x_i$ ($i=1$ to $n$); wherein $\lambda$ is a constant. Therefore, for 0.5% flatness target over a range R, the magnet length W should be:

$W \cong (R/1.8 \text{ mm})^*5 \text{ mm} \cong 2.8^*R$; and the distance d should be:

$d \cong (R/1.8 \text{ mm})^*0.60 \text{ mm} \cong 0.33^*R$.

Of course, these values for the magnet length W and the distance d are only approximate because of the mathematical imprecision inherent in determining points along a curve. Also, it may be desirable not to increase or decrease one or more of the dimensions (for instance, magnet thickness or width to minimize costs), which would somewhat skew the scaling law. For flatness targets of 0.1% and 1.0%, the equations above can be rewritten by substituting 1.8 mm with 1.2 mm and 2.2 mm, respectively.

Figure 8:
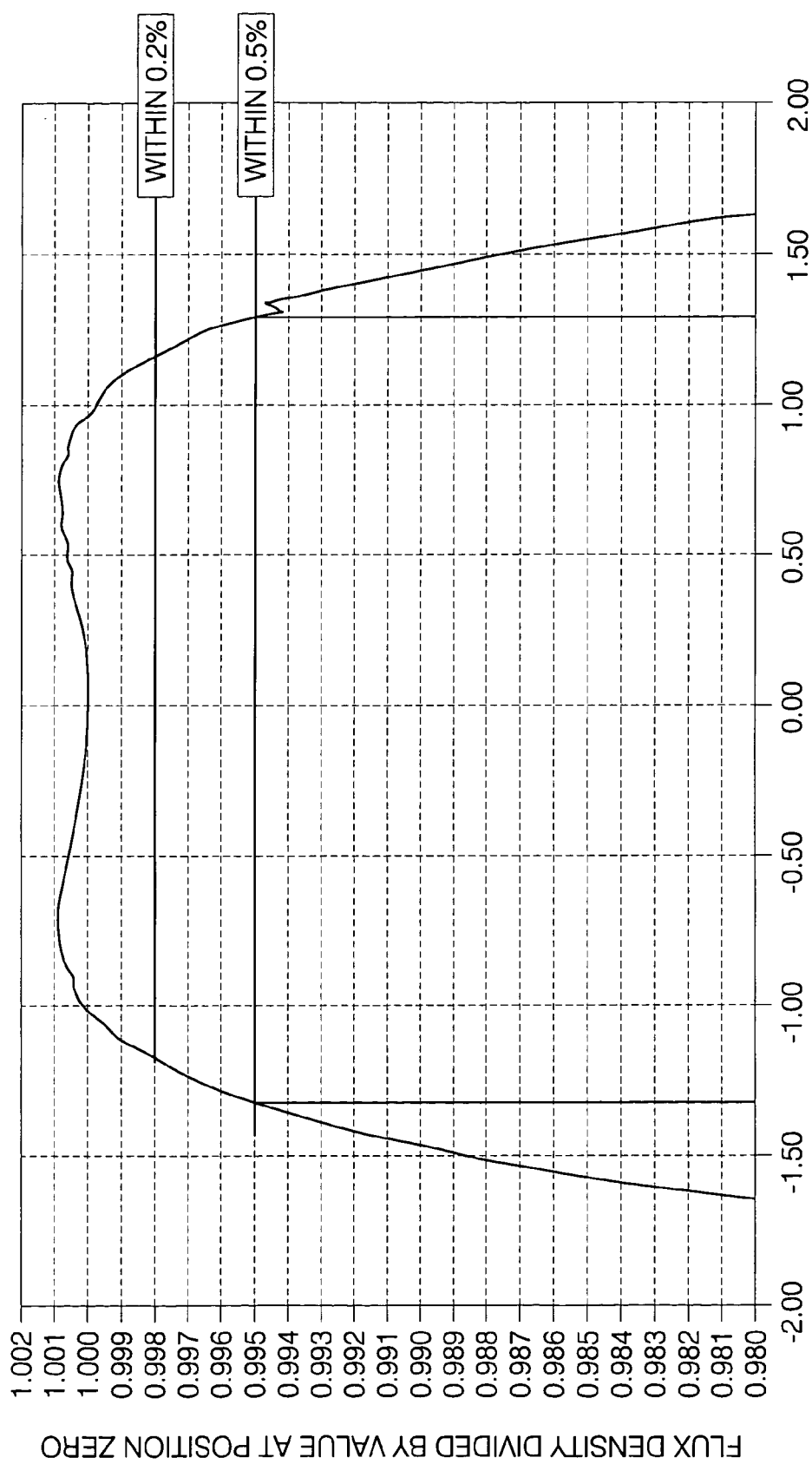
FIG. 8 is a graph of the magnetic flux density across a magnet in the absence of a target normalized to the value at the center of the magnet, where the magnet is designed to measure a position over a range of up to 2.2 mm.

Finite element analysis was used with other possible designs to further illustrate the various principles described herein. For example, when the desired range R is 2.2 mm, the magnet length W should be approximately 6.16 mm, while the distance d should be approximately 0.73 mm. Of course, the length L of the sensor array 12 is at least 2.2 mm. FIG. 8 shows test results for a magnet 14 with a length W of six mm, where the sensing elements 16 are at a distance d of 0.73 mm from the magnet surface 18. The flux density is within 0.5% of the value at the center of the magnet 14 over a range of 2.60 mm (2×1.30 mm), more than the targeted range R of 2.2 mm. The difference from the derived case is due to a slightly concave, rather than slightly convex, pattern. The concave pattern may be due to the fact that some design dimensions, e.g., magnet thickness and magnet width in the third dimension, were not changed from the derived case where the magnet length W was five mm.

Yet another case derived by finite element analysis shows that for a desired range R of 2.9 mm, the magnet length W should be approximately 8.1 mm, while the distance d should be approximately 0.96 mm. In testing, a magnet 14 with a length W of eight mm with sensing elements 16 at a distance d of 0.96 mm from the magnet surface 18 resulted in a flux density within 0.6% of its value in the center of the magnet 14 over a range of 2.9 mm. This example and that described with respect to FIG. 8 show that the experimental values yield a flux density curve close to the value of 0.5%.

Figure 9:
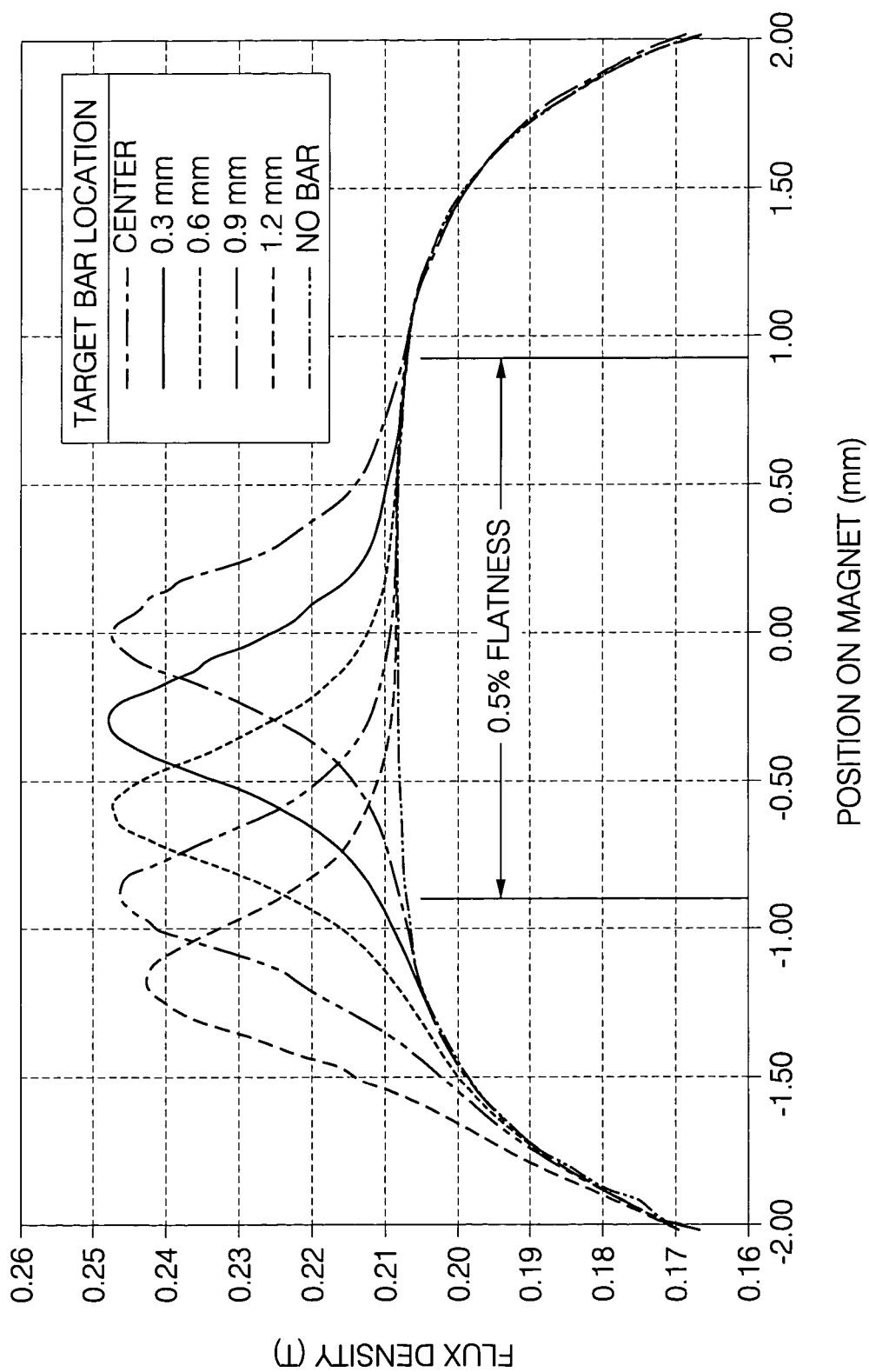
FIG. 9 is a graph of the magnetic flux density across the magnet according to FIG. 7 in the absence of a target and in the presence of targets at varying positions relative to the length of the magnet.

FIG. 9 shows the results for a magnet 14 having a magnet length W of five mm. The sensing elements 16 are located at a distance d of 0.60 mm from the magnet surface 18. The target 22 is 0.3 mm from the sensor array 12 (about 0.9 mm from the magnet surface 18). The dimensions of the target 22 are 0.1 mm by 0.3 mm. That is, the target 22 is a narrow 0.1 mm along the length L of the sensor array 12, but has a relatively thick height, 0.3 mm, normal to the magnet surface 18. Several curves are shown for various locations of the target 22 in 0.3 mm increments from the center of the magnet 14. Shown are curves where the target 22 is at the center of the magnet 14, and centered at −0.3 mm, −0.6 mm, −0.9 mm and −1.2 mm from the center of the magnet 14. These plots illustrate that the peak due to the presence of the target 22 moves with the target 22 and that the peak is essentially unchanged in magnitude or shape. It is worthwhile noting that the peak for the position −1.2 mm from the center of the magnet 14 is slightly lower than the other peaks, as this position is beyond the edge of the "flat" area. This results because the flux density curve exceeds the 0.5% flatness target at the position −0.9 mm. The peak flux density values for the various positions are summarized in the table below.

| Target distance from center (mm) | Peak flux density value (T) | Difference of peak flux density with value for target centered with magnet (%) |
| --- | --- | --- |
| 0 | 0.24775 | 0 |
| −0.3 | 0.24818 | 0.17% |
| −0.6 | 0.24738 | 0.15% |
| −0.9 | 0.24649 | 0.50% |
| −1.2 | 0.24306 | 1.90% |

As it would be in the case when there is no target 22 present, the flux density values are within 0.5% of the peak at the center of the magnet 14 for positions of the target 22 up to 0.9 mm away from the center of the magnet 14.

Figure 10:
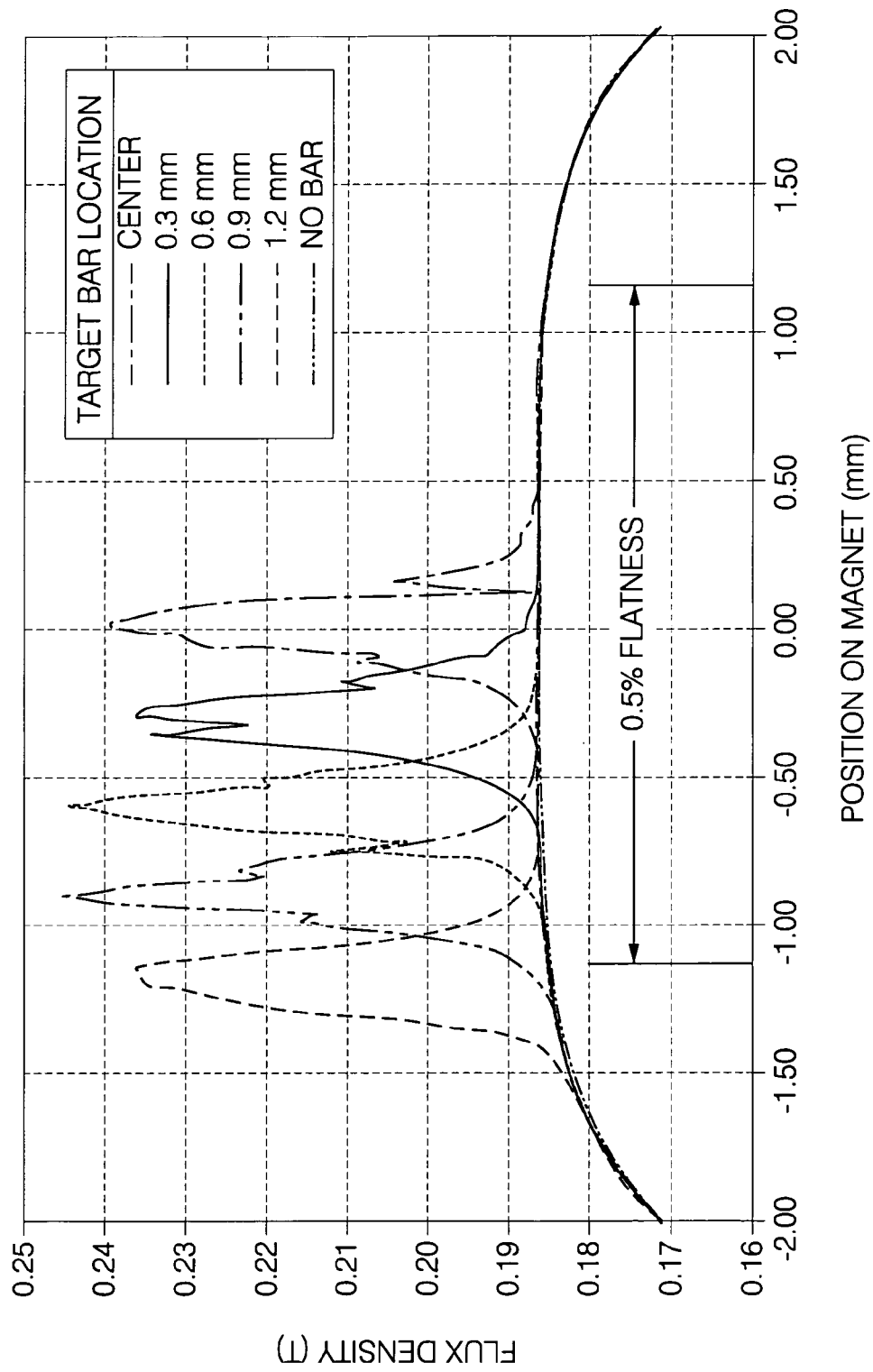
FIG. 10 is a graph of the magnetic flux density across the magnet according to FIG. 8 in the absence of a target and in the presence of targets at varying positions relative to the length of the magnet.

A 6-mm magnet 14 with sensing elements 16 located 0.80 mm from the magnet surface 18 was tested in the presence of a target 22 located at a distance of 0.1 mm from the sensing elements 16. The dimensions of the target 22 are 0.1 mm by 0.1 mm. The results of this test are shown in FIG. 10. Like FIG. 9, the peak is essentially unchanged in magnitude or shape, although some higher frequency fluctuations are noticeable in FIG. 10. The fluctuations are artifacts introduced by numerical inaccuracy, as flux density is read very close to a transition zone from air to iron, two materials with very different permeabilities. Highlighted by FIGS. 9 and 10 is the fact that although the target shape is different in each case, 0.1 mm wide in each case, but 0.3 mm high in the case of FIG. 9 and 0.1 mm high in the case of FIG. 10, the derived optimized dimensions of the sensor 10 are not affected.

Figure 11:
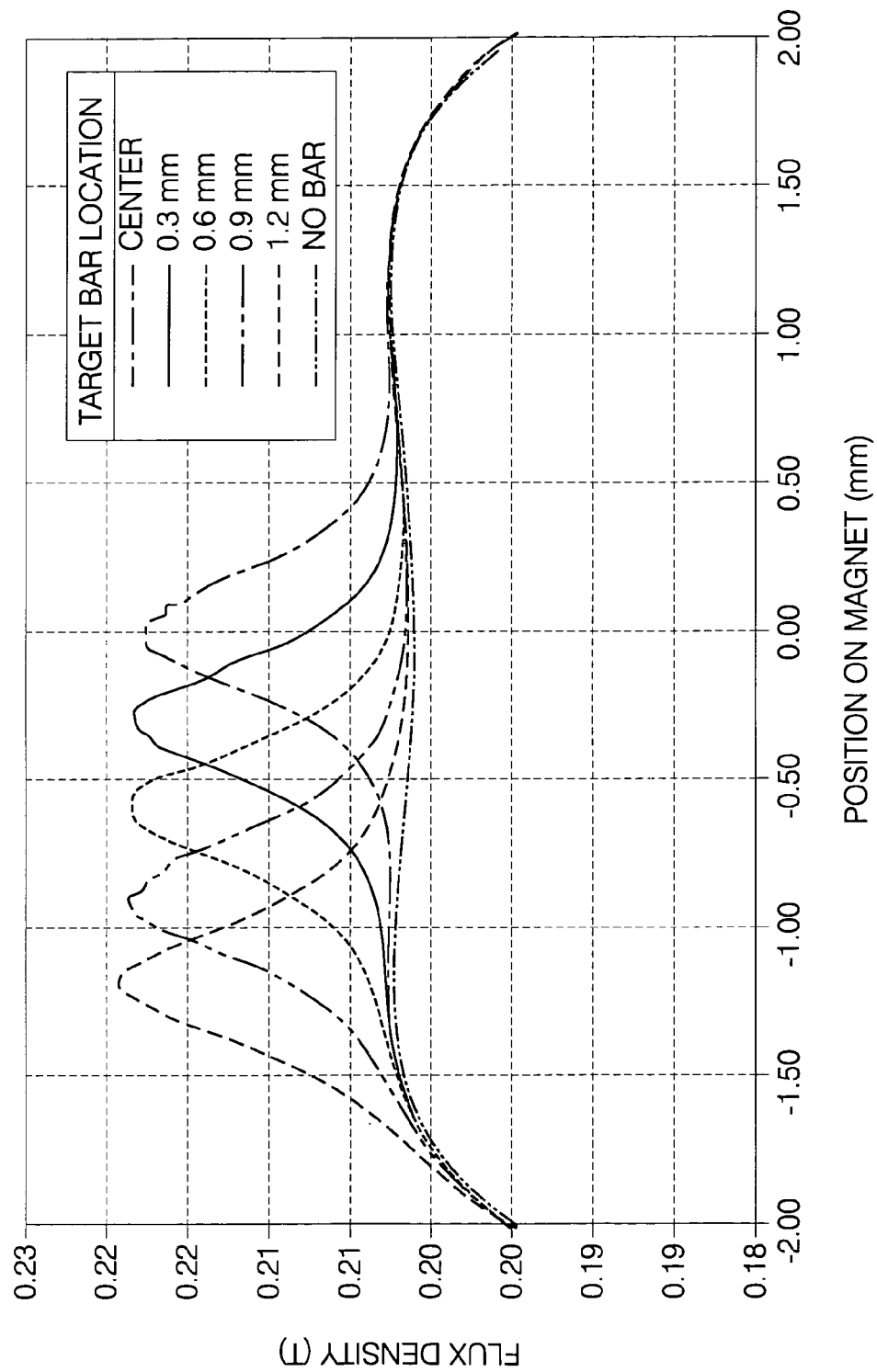
FIG. 11 is a graph of the magnetic flux density across the magnet according to FIG. 10 where the target is at a closer distance from the magnet than the targets of FIG. 10.

FIGS. 9 and 10 show the flux density pattern resulting from the presence of a target 22 in a sensor 10 with an optimized design derived as previously described. FIG. 11 shows the same 6-mm magnet 14 of FIG. 10, but with a non-optimized distance d of 0.6 mm. The target 22 has dimensions of 0.1 mm by 0.1 mm, and is located 0.3 mm from the sensing elements 16 (0.6 mm from the magnet surface 18). Because the sensor array 12 is closer to the magnet 14, the background pattern without a target 22 is concave rather than flat as described with reference to FIG. 6. Accordingly, the peak in the center of the magnet 14 is lower than the peak at a position −1.2 mm from the center. The accuracy of the position information obtained by reading the peak is not ascertainable without additional manipulation.

Figure 12:
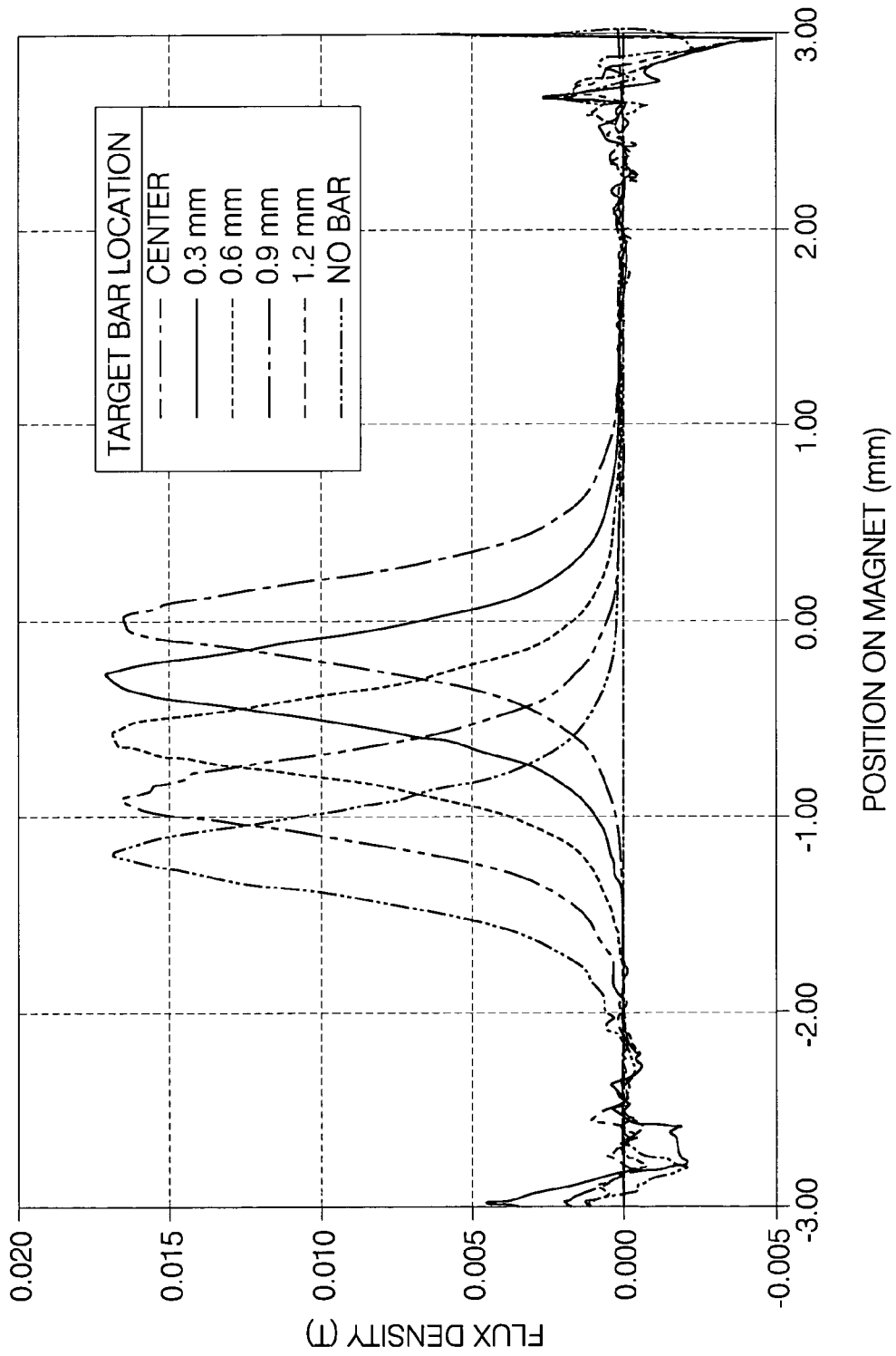
FIG. 12 is the graph of FIG. 11 with the background magnetic flux density pattern subtracted.

This additional manipulation can be in the form of subtracting the background pattern, as previously discussed. FIG. 12 shows the peaks obtained by subtracting the concave background pattern information from the curve of FIG. 11 using known mathematical techniques. The results are peaks similar in magnitude and shape to those in FIGS. 9 and 10. Thus, the first method can be used, but it requires a predetermination of the background pattern and the removal of the background pattern from the output flux density curve.

The results of the derivations and tests can be summarized to provide guidance as to the optimum configuration for a magnetic position sensor 10 using a sensor array 12. The array length L is at least as long as the desired range R of the sensor 10. Making the array length L equal to the range R minimizes expense and reduces the potential of damage to the sensor array 12. Assuming a desired range R, one configuration of the sensor 10 exists where:

$L \cong R;$ $W \cong 2.8*R;$ and $d \cong 0.33*R;$ where

W is the length of the magnet 14; and d is the distance from the magnet surface 18 to the bottom of the sensing elements 16.

Testing shows that sensors 10 with a longer magnet length W and larger distance d result in better performance, resulting in a configuration where:

$L \cong R;$ $W \cong 4.2*R;$ and $d \cong 0.50*R.$

When lesser performance is acceptable, and in order to lower cost, sensors 10 with shorter magnet lengths W and shorter distances d can be used such that:

$L \cong R;$ $W \cong 2.3*R;$ and $d \cong 0.27*R.$

Further testing indicates that placing the ferromagnetic target 22 as close to the sensor array 12 as possible is desirable. In addition, while square cross-sections for the ferromagnetic target 22 are acceptable, narrow but high target profiles provide better results. For example, the target 22 with the cross-section of 0.1 mm by 0.3 mm provides better results than the target 22 with the square cross-section of 0.1 mm by 0.1 mm. Thicker magnets will also yield stronger magnetic fields, but, of course, a thicker magnet also adds to cost and space requirements. Although not necessary, the inclusion of a ferromagnetic return path around the magnet is desirable as it also yields stronger magnetic fields.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A magnetic position sensor for measuring a position of a ferromagnetic target over a range of positions with respect to the position sensor, comprising:
    a magnet having a magnet length at least as long as the range; and
    a sensor array mounted upon a surface of the magnet, the array having an array length at least as long as the range and the array including a plurality of sensing elements mounted a fixed distance from the surface of the magnet; and wherein the magnet length and the fixed distance are such that a set of relatively constant values is measurable in the sensor array in the absence of the ferromagnetic target.

2. The magnetic position sensor according to claim 1 wherein the sensor array is a magnetoresistor sensor array.

3. The magnetic position sensor according to claim 1 wherein the set of relatively constant values measurable in the sensor array in the absence of the ferromagnetic target comprises a plurality of values of a component of magnetic flux density, each of the plurality of values being within a predetermined percentage of a value of the component of magnetic flux density at a center of the array.

4. The magnetic position sensor according to claim 3, further comprising:
    a circuit for measuring the component of magnetic flux density.

5. The magnetic position sensor according to claim 4, further comprising:
    a circuit for exciting the plurality of sensing elements.

6. The magnetic position sensor according to claim 3 wherein the component of magnetic flux density is normal to the magnet length.

7. The magnetic position sensor according to claim 3 wherein the predetermined percentage is one of 0.1% and 0.5% and 1.0%.

8. The magnetic position sensor according to claim 1 wherein the magnet length is approximately equal to 2.8 times the range, and the fixed distance is approximately equal to 0.33 times the range.

9. The magnetic position sensor according to claim 8 wherein the array length is equal to the range.

10. The magnetic position sensor according to claim 1 wherein the magnet length is approximately equal to 4.2 times the range, and the fixed distance is approximately equal to 0.50 times the range.

11. The magnetic position sensor according to claim 10 wherein the array length is equal to the range.

12. The magnetic position sensor according to claim 1 wherein the magnet length is approximately equal to 2.3 times the range, and the fixed distance is approximately equal to 0.27 times the range.

13. The magnetic position sensor according to claim 12 wherein the array length is equal to the range.

14. The magnetic position sensor according to claim 1 wherein the array is centered on the surface of the magnet.

15. The magnetic position sensor according to claim 1 wherein the ferromagnetic target is movably mounted above a surface of the sensor array opposite the surface of the magnet.

16. The magnetic position sensor according to claim 15, further comprising:
   a circuit for measuring the set of relatively constant values in the sensor array.

17. The magnetic position sensor according to claim 16, further comprising:
   a circuit for exciting the plurality of sensing elements.

18. A method of making a magnetic position sensor for measuring a position of a ferromagnetic target over a range, the method comprising the steps of:
   selecting a magnet having a magnet length at least as long as the range; and
   mounting a sensor array upon a surface of the magnet, the array having an array length at least as long as the range and the array including a plurality of sensing elements a fixed distance from the surface of the magnet; and wherein the magnet length and the fixed distance are such that a set of relatively constant values is measurable in the sensor array in the absence of the ferromagnetic target.

19. The method of making a magnetic position sensor according to claim 18 wherein the step of mounting a sensor array further comprises the step of mounting a magnetoresistor sensor array upon the surface of the magnet.

20. The method of making a magnetic position sensor according to claim 18, further comprising the step of:
   movably mounting the ferromagnetic target above a surface of the sensor array opposite the surface of the magnet.

21. The method of making a magnetic position sensor according to claim 18, further comprising the step of:
   coupling a circuit for measuring the values in the sensor array to each of the plurality of sensing elements.

22. The method of making a magnetic position sensor according to claim 18, further comprising the step of:
   coupling a circuit for exciting the plurality of sensing elements to each of the plurality of sensing elements.

23. The method of making a magnetic position sensor according to claim 18 wherein the set of relatively constant values in the sensor array comprises a plurality of values of a component of magnetic flux density, each of the plurality of values being within a predetermined percentage of a value of the component of magnetic flux density at a center of the array.

24. The method of making a magnetic position sensor according to claim 23 wherein the component of magnetic flux density is normal to the magnet length.

25. The method of making a magnetic position sensor according to claim 23 wherein the predetermined percentage is one of 0.1% and 0.5% and 1.0%.

26. The method of making a magnetic position sensor according to claim 18 wherein the step of selecting a magnet further comprises the step of selecting a magnet having a magnet length approximately equal to 2.8 times the range, the method further comprising the step of:
   forming the sensor array so the fixed distance is approximately equal to 0.33 times the range.

27. The method of making a magnetic position sensor according to claim 26 wherein the step of forming the sensor array further comprises the step of forming the array length equal to the range.

28. The method of making a magnetic position sensor according to claim 18 wherein the step of selecting a magnet further comprises the step of selecting a magnet having a magnet length approximately equal to 4.2 times the range, the method further comprising the step of:
   forming the sensor array so the fixed distance is approximately equal to 0.50 times the range.

29. The method of making a magnetic position sensor according to claim 28 wherein the step of forming the sensor array further comprises the step of forming the array length equal to the range.

30. The method of making a magnetic position sensor according to claim 18 wherein the step of selecting a magnet further comprises the step of selecting a magnet having a magnet length approximately equal to 2.3 times the range, the method further comprising the step of:
   forming the sensor array so the fixed distance is approximately equal to 0.27 times the range.

31. The method of making a magnetic position sensor according to claim 30 wherein the step of forming the sensor array further comprises the step of forming the array length equal to the range.

32. The method of making a magnetic position sensor according to claim 18, further comprising the step of:
   centering the array on the surface of the magnet.

33. A method of measuring the position of a ferromagnetic target over a range, the method comprising the steps of:
   forming a stationary magnetic position sensor, including the steps of:
      selecting a magnet having a magnet length at least as long as the range; and
      mounting a sensor array upon a surface of the magnet, the array having an array length at least as long as the range and the array including a plurality of sensing elements located a fixed distance from the surface of the magnet; and
   spacing the target apart from the plurality of sensing elements opposite the surface of the magnet, the target freely movable along the array over the range; and
   measuring a first plurality of values of a component of magnetic flux density across the magnet in the presence of the target; and
   selecting the magnet length and the fixed distance such that a set of relatively constant values of magnetic flux density is measurable across the magnet in the absence of the ferromagnetic target.

34. The method of measuring the position of a ferromagnetic target according to claim 33, further comprising the step of:

using a local peak of the magnetic flux density measured across the magnet to indicate the position of the target in the range.

35. The method of measuring the position of a ferromagnetic target according to claim 33 wherein the target has an area with one of a square cross-section and a rectangular cross-section.

36. The method of measuring the position of a ferromagnetic target according to claim 33 wherein the step of forming a stationary magnetic position sensor further includes the step of centering the array on the surface of the magnet.

37. A method of measuring the position of a ferromagnetic target over a range, the method comprising the steps of:
   forming a stationary magnetic position sensor, including the steps of:
      selecting a magnet having a magnet length at least as long as the range; and
      mounting a sensor array upon a surface of the magnet, the array having an array length at least as long as the range and the array including a plurality of sensing elements located a fixed distance from the surface of the magnet; and
   spacing the target apart from the plurality of sensing elements opposite the surface of the magnet, the target freely movable along the array over the range; and
   measuring a first plurality of values of a component of magnetic flux density across the magnet in the presence of the target; and
   measuring a second plurality of values of the component of magnetic flux density across the magnet in the absence of the target; and
   subtracting each of the second plurality of values of the component of magnetic flux density measured at a unique position along the magnet from one of the first plurality of values of the component of magnetic flux density measured at the same unique position along the magnet.

38. The method of measuring the position of a ferromagnetic target according to claim 37 wherein a result of the subtracting step is a local peak of magnetic flux density indicating the position of the target in the range.

39. A method of measuring the position of a ferromagnetic target over a range, the method comprising the steps of:
   forming a stationary magnetic position sensor, including the steps of:
      selecting a magnet having a magnet length at least as long as the range; and
      mounting a sensor array upon a surface of the magnet, the array having an array length at least as long as the range and the array including a plurality of sensing elements located a fixed distance from the surface of the magnet; and
   spacing the target apart from the plurality of sensing elements opposite the surface of the magnet, the target freely movable along the array over the range; and
   measuring a first plurality of values of a component of magnetic flux density across the magnet in the presence of the target further comprising the step of:
      measuring a first component of magnetic flux density normal to the magnet length at a plurality of positions along the magnet length further comprising the step of:
         measuring the first component of magnetic flux density normal to the magnet length at each of the plurality of sensing elements;
      measuring a second component of magnetic flux density normal to the magnet length at each of the plurality of sensing elements in the absence of the target; and
      subtracting the second component from the first component for each of the plurality of sensing elements.

40. A method of measuring the position of a ferromagnetic target over a range, the method comprising the steps of:
   forming a stationary magnetic position sensor, including the steps of:
      selecting a magnet having a magnet length at least as long as the range; and
      mounting a sensor array upon a surface of the magnet, the array having an array length at least as long as the range and the array including a plurality of sensing elements located a fixed distance from the surface of the magnet; and
   spacing the target apart from the plurality of sensing elements opposite the surface of the magnet, the target freely movable along the array over the range; and
   measuring a first plurality of values of a component of magnetic flux density across the magnet in the presence of the target further comprising the step of:
      measuring a first component of magnetic flux density normal to the magnet length at a plurality of positions along the magnet length;
   measuring a second component of magnetic flux density normal to the magnet length at the plurality of positions along the magnet in the absence of the target; and
   subtracting the second component of magnetic flux density from the first component of magnetic flux density at each of the plurality of positions.

* * * * *